United States Patent [19]

Noda

[11] 4,456,194
[45] Jun. 26, 1984

[54] FISHING REEL WITH CONTROL LEVER GUARD

[75] Inventor: Hideo Noda, Osaka, Japan

[73] Assignee: Shimano Industrial Company Limited, Osaka, Japan

[21] Appl. No.: 407,141

[22] Filed: Aug. 11, 1982

Related U.S. Application Data

[63] Continuation of Ser. No. 169,313, Jul. 16, 1980, abandoned.

[30] Foreign Application Priority Data

Jul. 27, 1979 [JP] Japan .................. 54-104389[U]
Jul. 27, 1979 [JP] Japan .................. 54-104390[U]

[51] Int. Cl.³ ............................................ A01K 89/01
[52] U.S. Cl. ............................................ 242/84.2 A
[58] Field of Search ............... 242/84.2 A, 84.21 A

[56] References Cited

U.S. PATENT DOCUMENTS

| D. 191,114 | 8/1961 | Sparks et al. | |
|---|---|---|---|
| 3,074,665 | 1/1963 | Marrow | 242/84.21 A |
| 3,255,980 | 6/1966 | Ueno | 242/84.2 A |
| 3,327,962 | 6/1967 | Sarah | 242/84.2 A |
| 3,794,264 | 2/1974 | Hull | 242/84.2 A |

FOREIGN PATENT DOCUMENTS 37-29943 11/1962 Japan .
52-116588 of 1978 Japan .

Primary Examiner—Billy S. Taylor
Attorney, Agent, or Firm—Stevens, Davis, Miller & Mosher

[57] ABSTRACT

A fishing reel of the closed face type, which is provided with a frame, a front cover and a rear cover, the rear cover supporting at its rear portion a control lever for operating a fishing line wind-up control mechanism. At the rear of the rear cover is formed a guard portion extending rearwardly from the rear of the rear cover and surrounding the control lever except for the outer surface thereof.

3 Claims, 8 Drawing Figures

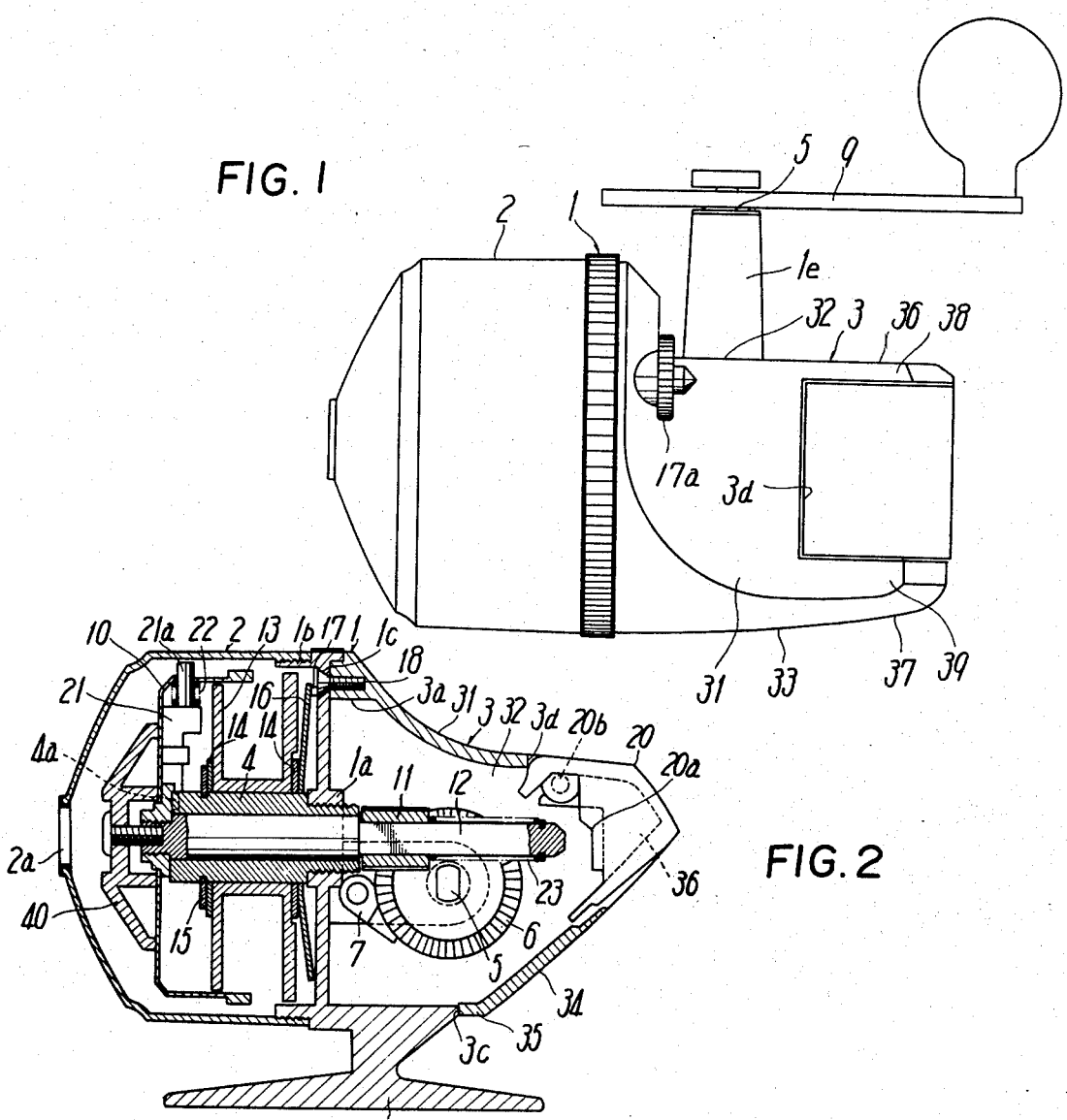
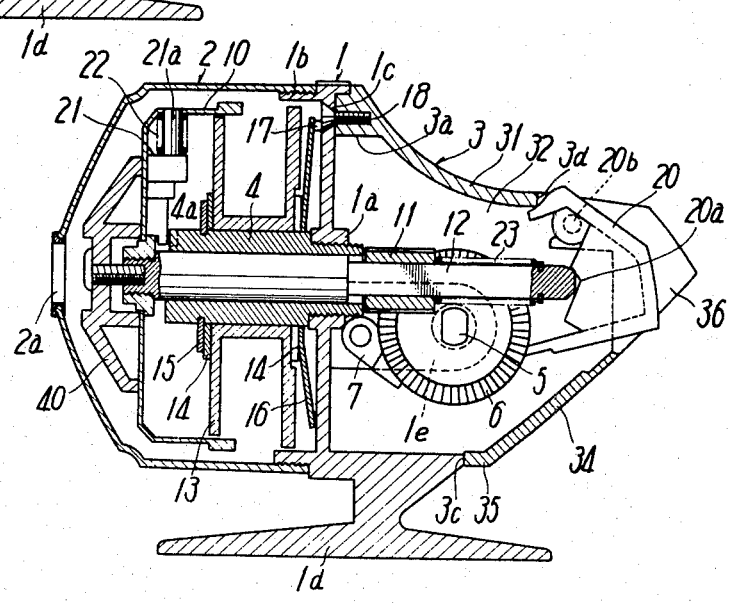

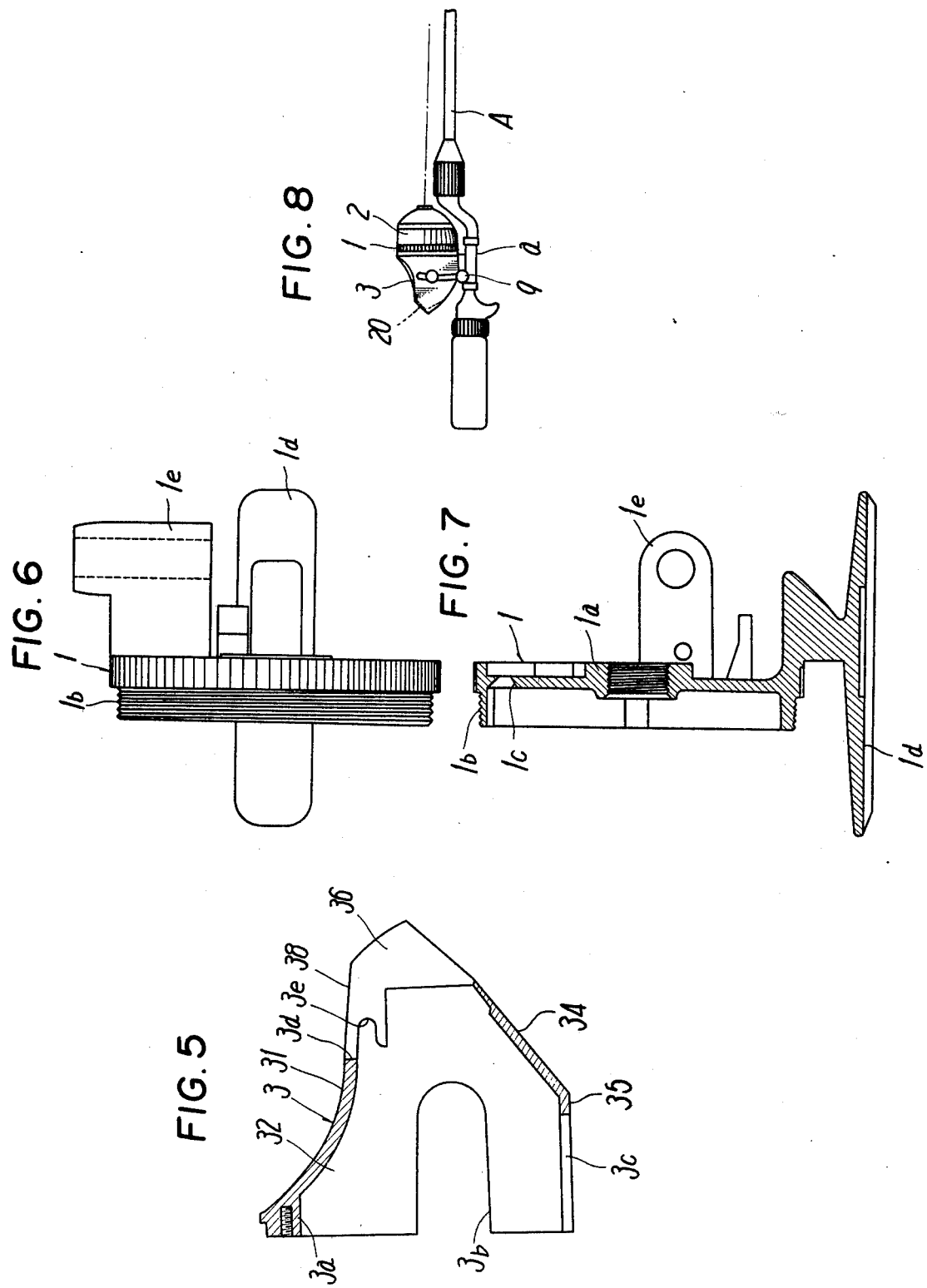

FISHING REEL WITH CONTROL LEVER GUARD

This is a continuation of application Ser. No. 169,313 filed July 16, 1980 now abandoned.

FIELD OF THE INVENTION

This inveniton relates to a fishing reel, and more particularly to a fishing reel of a closed face type, which is provided with a frame, a front cover mounted on the front of the frame, and a rear cover mounted on the rear of the frame.

BACKGROUND OF THE INVENTION

Generally, a fishing reel of a closed face type is provided with a tubular shaft extending longitudinally of the reel and fixed to the front of the frame, a rotary shaft supported to the tubular shaft in relation of being rotatable and movable longitudinally of the reel, a handle shaft supported at the rear of the frame, and a transmitting mechanism which transmits rotation of the handle shaft to the rotary shaft and is provided between the handle shaft and the rotary shaft. The tubular shaft carries a spool, the rotary shaft carries a rotary member which includes a fishing line wind-up control mechanism, and the rear cover is provided at the rear portion thereof with a control lever to operate the wind-up control mechanism.

The rear cover of the conventional fishing reel, however, is of a rectangular box-like shape and the control lever mounted on the rear cover projects outwardly from the rear surface thereof.

This kind of fishing reel is most used for fishing on a boat. An angler grasps the rear cover together with a fishing rod and winds up a fishing line after casting, at which time he often carelessly touches the control lever with his hand which is grasping the rear cover because the control lever projects outwardly therefrom, thereby actuating the control lever to free the fishing line.

An added problem with this type of reel is that the rear cover does not fit the palm of an angler's hand which grasps the rear cover very well during casting or winding up the line, and also a corner of the rear cover presses the angler's palm so that he soon feels an unbearable pain in his hand.

SUMMARY OF THE INVENTION

In the light of the aforesaid problems, this invention has been designed. A main object of the inveniton is to provide a fishing reel which prevents a control lever from being actuated even if the angler carelessly touches the lever with his hand grasping a rear cover during winding of the line on a spool at the reel. Another object of the invention is to provide a fishing reel having a rear cover which better fits the palm of angler's hand so that the angler can wind up the line while grasping the rear cover without pain or discomfort in his hand so that he is less tired from fishing even for a long time.

The fishing reel of the invention is so constructed that the rear cover is extended rearwardly thereof to form an extension, with which a control lever mounted on the rear portion of the rear cover is surrounded except for the outer surface of the control lever. The extension forms a guard for the control lever so that even if the angler carelessly touches the control lever with his hand which is grasping the rear cover during winding of the line on the spool, the control lever is not actuated, thereby ensuring continual wind-up of the fishing line.

In greater detail, the rear cover comprises an upper wall, a pair of first and second side walls in continuation of both widthwise sides of the upper wall, and a rear wall in continuation of the side walls and upper wall. At a widthwise intermediate portion of the rear wall is provided an opening into which the control lever is fitted. the upper wall and first and second side walls extend rearwardly to form extensions at both widthwise sides of the opening, the extensions being used for guarding the control lever so that the control lever is supported between and inside the guard extensions.

This construction makes it possible to protect the control lever by means of the above guards. Even when the angler places a part of his palm on the control lever, the guards restrain the palm from entering between them. Hence, the control lever could slightly operate, but a fishing line wind-up control mechanism is never actuated by the control lever.

The rear cover, other than being formed in a rectangular shape, is preferably constructed such that; the second side wall opposite to the first side wall through which a handle shaft projects and at a side of a handle bar, in other words, the second side wall at a side of the angler's hand which grasps the rear cover, is formed in a circular arc to have an outer diameter about equal to that of a cylindrical front cover and is in continuation thereof; and the upper wall is partially curved upwardly to form a concave surface and is connected at the front end with the rear of the front cover, and also has a horizontal rear end portion which is connected with the rear wall.

Consequently, the angler, when repeatedly casting or winding-up the line while grasping the rear cover even for a long time, is more comfortable and less tired from fishing.

Other and further objects, features and advantages of the invention will appear more fully from the following description.

BRIEF DESCRIPTION OF THE DRAWINGS

FIG. 1 is a plan view of an embodiment of a fishing reel of the invention,

FIG. 2 is a longitudinally sectional view of the embodiment in FIG. 1,

FIG. 3 is a longitudinally sectional view of a control lever when operated,

FIG. 5 is a sectional view of a rear cover only,

FIG. 6 is a plan view of a frame only,

FIG. 7 is a sectional view thereof, and

FIG. 8 is a view explanatory of using the fishing reel.

DETAILED DESCRIPTION OF THE INVENTION

Figure 4:
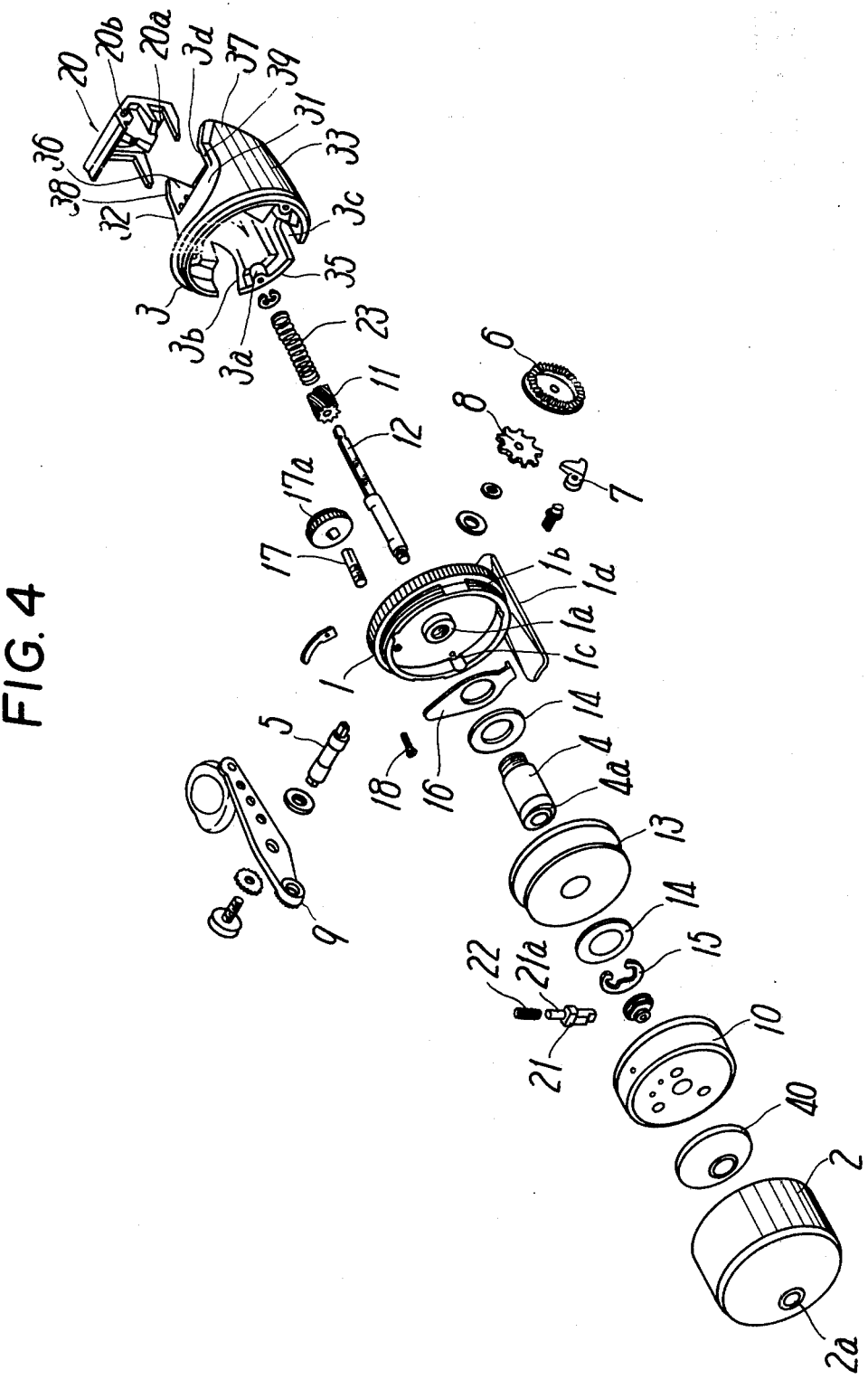
FIG. 4 is a perspective exploded view of the fishing reel of the invention.

In the drawings, reference numeral 1 designates a frame which comprises a disc having at its center a boss 1a. The frame 1, as shown in FIGS. 6 and 7, is provided at the outer periphery with a flange 1b for mounting a front cover 2 and through bores 1c for set screws, and at one side of the outer periphery with a leg 1d for mounting the reel on a fishing rod and at the position shifted at 90 degrees from the leg 1d with a bearing portion 1e for supporting therewith a handle shaft 5. A tubular shaft 4 is fixed to the boss 1a through screw means and the handle shaft 5 is supported rotatably to the bearing portion 1e.

The handle shaft 5 screws at its innermost end with a master gear 6 and with an anti-reverse-rotation gear 8 in mesh with an anti-reverse-rotation pawl 7 fixed to the frame 1, and has at an outermost end an operating handle bar 9 fixed thereto.

The tubular shaft 4 supports therein a rotary shaft 12 in relation of being rotatable and movable longitudinally of the reel, and carries at the outer periphery a spool 13 in relation of being freely rotatable.

The rotary shaft 12 has at its foremost end a cup-like shaped rotary member 10 fixed thereto through a fixing member 40 and supports at an axially intermediate portion a pinion 11 in mesh with the master gear 6 which is only axially slidable, the master gear 6 and pinion 11 constituting a transmitting mechanism for transmitting the rotaion of handle shaft 5 to the rotary shaft 12.

Also, the rotary shaft 12, as shown in FIGS. 2 and 3, is stepped so that its larger diameter portion is inserted into the tubular shaft 4, and its smaller diameter portion is made square in section to thereby support the pinion 11. The pinion 11 rotates integrally with the rotary shaft 12 and is movable relative thereto. Substantially, the pinion 11, when the rotary shaft 12 axially moves, is kept in mesh with the master gear 6 and does not follow movement of rotary shaft 12.

The spool 13 comprises a trunk and a pair of flanges provided at both axial ends of the trunk so that a fishing line (not shown) is wound on the trunk, and is provided at its both axial sides with friction plates 14 attached thereto. One friction plate 14 has at its outside a stopper 15, and the other friction plate 14 has, at its outside an elastically deformable plate 16, so that an adjustor 17 having a control element 17a and supported to the rear cover 3 is controlled to bias the plate 16, thereby applying to the spool 3a prescribed resistance against its free rotation.

The fishing line is wound on the spool 13 by use of the rotary member 10 rotated by the rotating handle shaft 5 and of a fishing line wind-up control mechanism to be hereinafter described. The wind-up control mechanism is controlled by a control lever 20 to be hereinafter described, which permits the line to be free and to be drawn out of the spool 13 for casting.

The fishing line winding-up control mechanism, as well-known, comprises a slider 21 provided at the rotary member 10 and a cam face 4a at the outer periphery of the foremost end of tubular shaft 4, the slider 21 having a nipple 21a projectable radially outwardly from the rotary member 10 through a bore thereat and being always biased radially inwardly of the rotary member 10 through a spring 22. The control lever 20 is operated to move the rotary shaft 12 and rotary member 10 axially forward to thereby control the winding-up control mechanism. In detail, the rotary member 10 moves forward so that the slider 21 riding on the tubular shaft 4 falls in a gap between the rotary member 10 and the tubular shaft 4 through the spring 22 as shown in FIG. 3. Hence, the nipple 21a sinks radially inwardly of the rotary member 10 to make the line free to be drawn out of the spool 13. In this condition, when the control lever 20 is released to rotate the rotary shaft 12, a return spring 23 provided thereat acts to restore the rotary shaft 12, whereby the slider 21 rides on the cam face 4a and then climbs onto the foremost end of tubular shaft 4 through the rotation of rotary shaft 12, thus allowing the nipple 21a to project from the rotary member 10 as shown in FIG. 2. Consequently, the nipple 21a retains the line and winds it on the spool 13 through the rotation of rotary member 10.

The front cover 2 is cylindrical and bottomed frontward and has at the center of the bottom a fishing line guide bore 2a and at the inner periphery of the axially rear end a screw thread screwable with the flange 1b at the frame 1. The tubular shaft 4, spool 13, rotary member 10, and fixing member 40, are covered by the front cover 2.

The rear cover 3, as shown in FIGS. 1 through 5, has an upper wall 31, a pair of first and second side walls 32 and 33 in continuation of both widthwise sides of upper wall 31, a rear wall 34, and a lower wall 35. The front ends of the upper wall 31, first and second side walls 32 and 33, and lower wall 35, integrally form a short cylindrical portion equal in diameter to the frame 1 as shown in FIG. 4. The cylindrical portion contacts with the rear end of frame 1 and is provided at the inner periphery of the front end with a plurality of bosses 3a having threaded bores so that set screws 18 are inserted through the bores 1c at the frame 1 from the front side thereof and screwed with the threaded bores at the bosses 3a, thereby fixing the rear cover 3 to the frame.

The first side wall 32, as shown in FIG. 4, is vertical and has a cutout 3b through which the bearing portion 1e at the frame 1 is insertable, so that the handle shaft 5 may project out of the first side wall 32 through the cutout 3b.

The second side wall 33 is formed in a circular arc of an outer diameter equal to that of the front cover 2, in other words, an outer diameter of the front cylindrical portion of rear cover 3, and is connected to the front cover 2. The upper wall 31 is curved upwardly to form a concave upper surface which is in continuation of the cylindrical front portion of rear cover 3. The rear end portion of upper wall 31, as shown in FIGS. 2 and 3, is horizontal and in continuation of the rear wall 34 at a lower level than the front end of rear cover 3. In addition, the front end of second side wall 33 is necessary to be similar in shape to the front cover 2 and in continuation thereof, but may be gradually reduced in diameter rearwardly from the front end of side wall 33 as shown in FIG. 1.

The lower wall 35 may be formed in a circular arc in continuation of the cylindrical front portion of rear cover 3, or made horizontal. In either case, the lower wall 35 has a cutout 3c through which the mounting leg 1d is inserted.

The rear cover 3 constructed as just described is provided at the rear portion thereof with the control lever 20 for moving the rotary shaft 12 axially forward to operate the wind-up control mechanism. The rear wall 34 of rear cover 3 is provided at a widthwise intermediate portion with an opening 3d. The side walls 32 ad 33 and the upper wall 31 at both widthwise end portions thereof, are extended rearwardly to form extensions 36, 37, 38 and 39, widthwise sandwiching the opening 3d. The extensions 36, 37, 38 and 39 support therebetween the control lever 20 in an embracing manner and are used as guards for the lever 20.

In other words, the rear cover 3 extends at its rear portion axially rearwardly of the rotary shaft 12 beyond the rear end of rotary shaft 12 so that the opening 3d is formed at the extension of rear cover 3, leaving the first and second side walls 32 and 33 and both the widthwise end portions of upper wall 31 in continuation of the side walls 32 and 33. The remaining extensions of side walls 32 and 33 and both the widthwise end portions of upper wall 31, form guards 36 through 39 between which the control lever 20 is inserted so that the control lever 20 may be exposed at its outer surface only.

The control lever 20, as shown in FIGS. 2 through 4, is molded from synthetic resin and formed in a substantially inverted L-like shape in section, and also is provided at the internally middle portion thereof with a pushing portion 20a engageable with the axial rear end of rotary shaft 12, and at both widthwise end portions forward from the pushing portion 20a with studs 20b, the studs 20b being pivotably fitted into cutouts 3e provided at the inside of the respective side walls 32 and 33.

The cutouts 3e, as shown in FIG. 5, are formed at the front portion of extensions 36 and 37 larger in thickness and are open frontward respectively. The studs 20b at the control lever 20 are pivotably fitted into the cutouts 30 e respectively, so that the control lever 20 is kept from escaping rearward.

The angler pushes by his finger the control lever 20 at its middle portion to allow the pushing portion 20a to abut against the rear end of rotary shaft 12 to thereby move the rotary shaft 12 forward and actuate the line wind-up control mechanism, thus freeing the line. The line wind-up mechanism is operable only by the push control of angler's finger, whereby even if the angler carelessly touches the control lever 20 with the palm of his hand, the control lever 20 never actuates the wind-up control mechanism.

In detail, the control lever 20 is exposed only at its outer surface from the rear cover 3 and guarded laterally by means of the guards 36 through 39. Hence, even if the angler touches the outer surface of control lever 20 with his palm, the guards 36 through 39 restrict his palm from pushing and this actuating the control lever 20. As a result, even when gripping the rear cover 3 with his hand, he never actuates the control lever 20, and cannot operate the line winding-up control mechanism.

The fishing reel of the invention constructed as described above is mounted on the fishing rod (FIG. 8) at a reel mounting portion A thereof. When the tackle at an end of the fishing line is cast, the control lever is pushed by the angler's thumb to permit the line to be freely drawn out of the spool 13. On the contrary, when the line is wound on the spool 13 after hooking a fish, the angler grasps the rear cover 3, for example, by the palm of his left hand in a manner of embracing the rear cover 3, and turns the operating handle 9 by his right hand. The rear cover 3 constructed as foregoing fits well the palm of his left hand and also has no protuberance, such as a set screw, or angular portion to thereby enable the angler to grasp the rear cover 3 for a long time without pain in his hand.

Furthermore, even if the angler touches the control lever 20 with his hand grasping the rear cover 3, the control lever 3, which is guarded by the extensions 36 through 39, never actuates the line wind-up control mechanism. Hence, the fishing line, when wound on the spool 13, is prevented from being carelessly set free.

In addition, the pushing portion 20a of control lever 20 is positioned rearward beyond the studs 20b so that the stroke of forward movement of rotary shaft 12 required for operation by the control lever 20 is made larger. Hence, even when the palm of angler's hand grasping the rear cover 3 presses the control lever 20 to slightly swing it, the control lever 20 is not actuated, nor is the wind-up control mechanism.

Furthermore, the control lever 20 is provided at the lower upper surface of rear cover 3, thereby facilitating operation of the lever 20 for casting.

According to this invention as described hereinabove, the control lever is never actuated even when the angler carelessly touches the control lever with his hand grasping the rear cover while winding the line on the spool, whereby he can ensure the winding-up of line while grasping the rear cover during fishing.

Also, the guards for the control lever, which are constructed as foregoing, do not hinder the angler from casting or winding-up the line while grasping the rear cover. The angler also can operate the control lever with ease by the finger of his hand grasping the rear cover because the control lever is fitted between the guards of the rearward extensions of the rear cover.

Furthermore, the rear cover constructed as foregoing well fits the palm of angler's hand grasping the rear cover so that the angler feels no pain or discomfort even when winding up the line grasping the rear cover, allowing him to grip the reel for a long time.

While a preferred embodiment of the inveniton has been described, such description is for illustrative purpose only, and it is to be understood that changes and variations may be made without departing from the spirit or scope of the invention, the invention being defined in the following claims.

What is claimed is:

1. A fishing reel comprising: a frame having a mounting leg, a front cover mounted on the front of said frame and having a round outer periphery and a rear end portion, a rear cover mounted on the rear of said frame, said frame carrying a non-rotatable tubular shaft extending longitudinally of said reel, a rotary shaft rotatably supported to said tubular shaft and movable longitudinally of said reel, a handle shaft, and a transmitting mechanism for transmitting rotation of said handle shaft to said rotary shaft, said tubular shaft carrying a spool, said rotary shaft carrying a rotary member, said rotary member having a wind-up control mechanism for winding a fishing line on said spool, said rotary shaft being movable forward to operate said wind-up control mechanism to free said fishing line, said rear cover having a control lever for moving said rotary shaft forward to operate said wind-up control mechanism, said control lever being positioned at an upper rearward corner of the rear portion of said rear cover and exposed at its outer surface, said rear cover having an upper wall which has opposite widthwise sides and which is curved upwardly toward said first cover to form a concave grasping surface, said upper wall having a front end portion consecutive to the rear end portion of said front cover and a rear end portion, a pair of first and second side walls in continuation of both widthwise sides of said upper wall respectively, said second sidewall being formed in a circular arc which has an outer diameter approximately equal to that of the round outer periphery of said front cover, and a rear wall, said rear end portion of said upper wall being horizontal and consecutive to said rear wall, said rear wall having at a widthwise intermediate portion thereof an opening which is located at said corner, said opening having opposite widthwise sides which are defined by extensions extending rearwardly from said upper wall and first and second side walls, said control lever closing said opening and moving therewithin when operated, said extensions each having an upper wall which extends substantially horizontally at a rear end portion of said rear cover and which is substantially at the same level as an upper surface of said control lever, so that said control lever is supported between and inside said extensions so as not to project substantially outwardly of said extensions.

2. A fishing reel according to claim 1, wherein said first side wall has a through bore for said handle shaft, said handle shaft projecting outwardly from said first side wall.

3. A fishing reel according to claim 1, wherein said control lever has pivotal portions pivoted to the rear end portion of said rear cover and an urging portion engageable with an axial rear end of said rotary shaft to thereby urge said rotary shaft forward, said urging portion being disposed rearwardly beyond said pivot portions.

* * * * *